Sept. 27, 1960

R. C. WHITEHEAD, JR 2,954,457

CONTROLLER

Filed July 23, 1958

INVENTOR.
ROBERT C. WHITEHEAD JR.

BY Arthur H. Swinson

ATTORNEY.

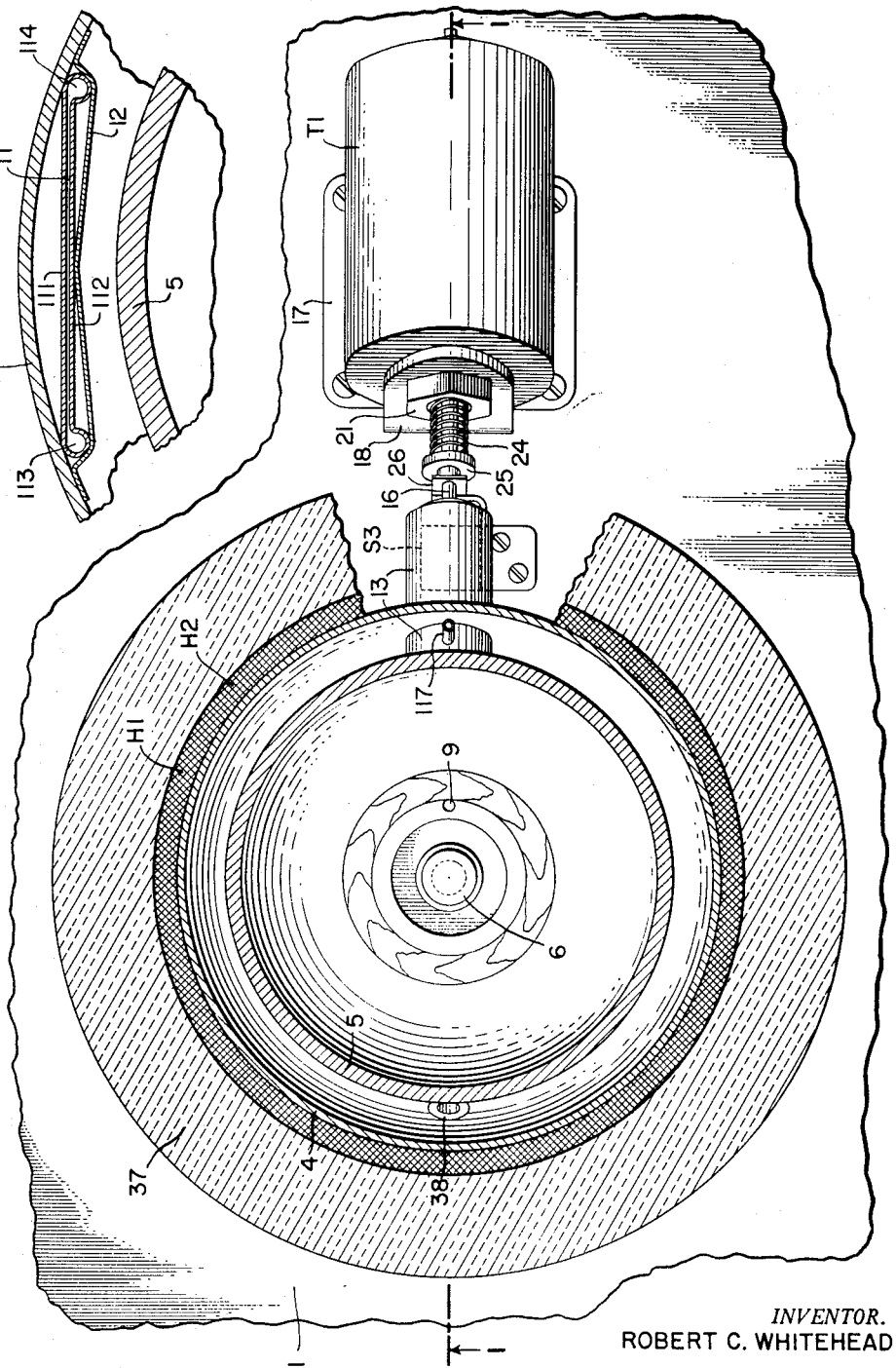

Sept. 27, 1960

R. C. WHITEHEAD, JR
CONTROLLER 2,954,457

Filed July 23, 1958

INVENTOR.
ROBERT C. WHITEHEAD JR.

BY Arthur H. Swanson

ATTORNEY.

United States Patent Office 2,954,457
Patented Sept. 27, 1960

2,954,457

CONTROLLER

Robert C. Whitehead, Jr., Oreland, Pa., assignor to Minneapolis-Honeywell Regulator Company, Minneapolis, Minn., a corporation of Delaware Filed July 23, 1958, Ser. No. 750,460

3 Claims. (Cl. 219—38)

An object of this invention is to provide a source of high pressure which can serve as a reference or datum from which deviations can be measured and control can be exercised.

More specifically, it is an object of this invention to provide a source which can produce an absolute pressure of 1800 pounds per square inch to an accuracy of $\frac{1}{10}$ of 1%.

Still more specifically, it is an object of this invention to provide a source of pressure employing a dual, two-phase system. One part of this system is the use of the temperature at which pure lead melts as a solid-liquid phase. Another part is the use of distilled water as a liquid-gas phase. Lead and water are two simple substances which are readily available.

It is a further object of this invention to provide an accurate source of high pressure which retains its accuracy even when subjected to very severe shocks and to changes of position.

A better understanding of the present invention may be had from the following detailed description when read in connection with the accompanying drawings, in which:

Fig. 2 is a substantially horizontal cross section on the line 2—2 of Fig. 1 as viewed in the direction of the arrows.

Fig. 3 is a cross section on the line 3—3 extending radially of Fig. 1 as viewed in the direction of the arrows.

Figure 1:
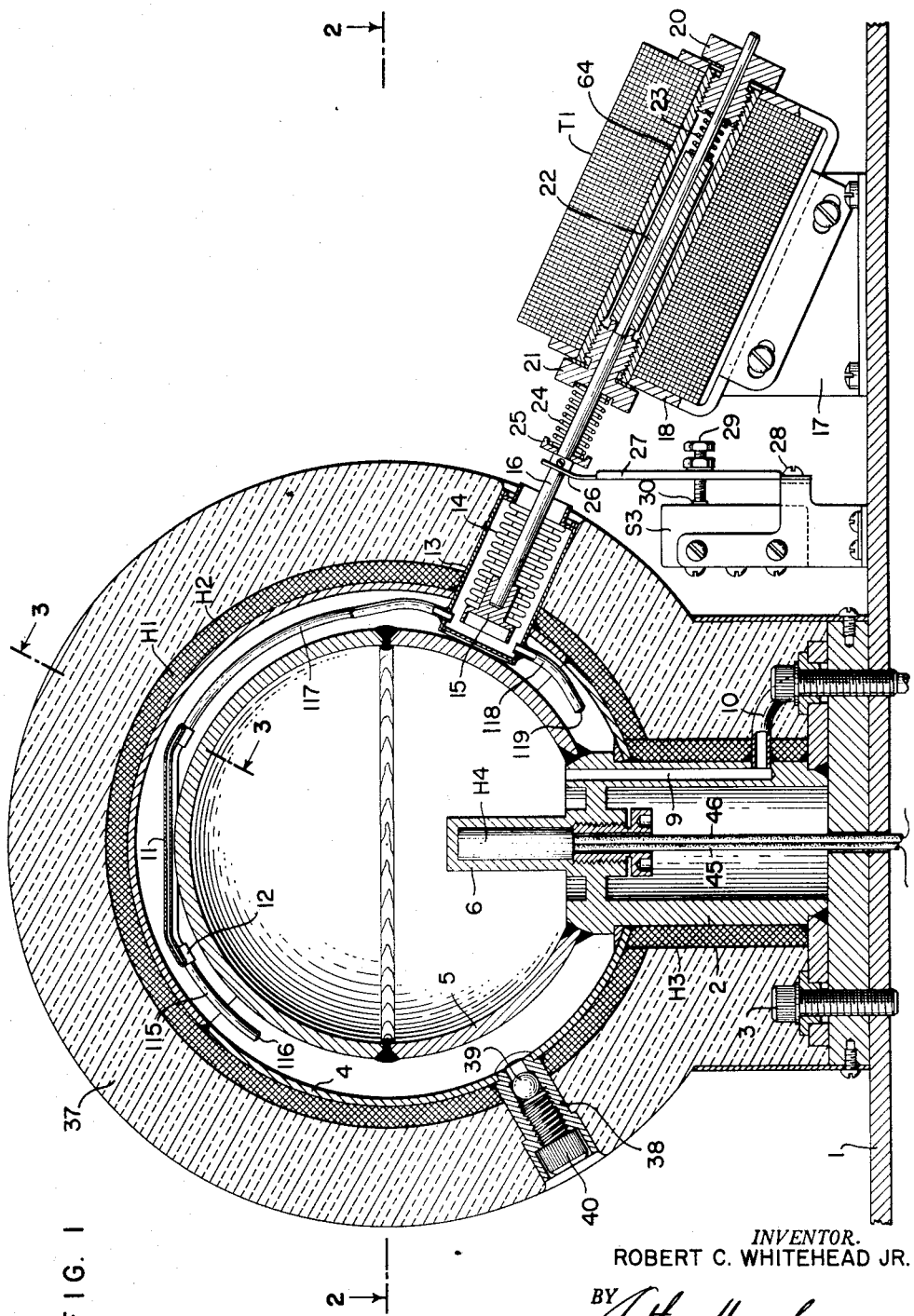
Fig. 1 is a substantially vertical cross section on the line 1—1 of Fig. 2 as viewed in the direction of the arrows.

The pressure source of this invention comprises both a control unit and a reference unit. The reference unit includes a base plate or support 1 on which is mounted a column 2 which is secured to base plate 1 by a plurality of cap head screws 3. To the upper end of column 2 is welded an outer sphere 4 and an inner sphere 5, each being of stainless steel. The upper end of column 2 is separated from the interior of inner sphere 5 by a tubular member 6 in which is mounted an electric heating device or cartridge H-4 to which electricity is conducted by means of wires 45 and 46. Another heater H-3 is wrapped around column 2. On the outer surface of outer sphere 4 is located a pair of electric heating devices H-1 and H-2 which together with the outer surface of sphere 4, are covered with a layer 37 of insulation against the escape of heat from the sphere. Glass or quartz wool is a suitable material for this insulation.

In the space between the spheres 4 and 5 is located the input end of a pressure-receiving system. This input end consists of a substantially flat, stainless steel tube 11 secured to the inside of outer sphere 4 by flat strips 12 (Figs. 1 and 3). Tube 11 has a pair of relatively flat sides 111 and 112 and a pair of substantially circular ends 113 and 114 extending along the edges of the flat sides. Tube 11 has a filling tube 115 closed at its end 116 and attached at its interior to tube 11. A substantially Z-shaped tube 117 connects the interior of tube 11 with the interior of a cylinder 13 welded on outer sphere 4. A second filling tube 118 closed at its end 119 is attached at its interior to the interior of cylinder 13. A bellows 14 is secured at its right, stationary end to the cylinder 13 so as to form therewith a closed chamber. The left, normally movable end of bellows 14 carries a thimble 15 to which is attached one end of a rod 16.

On base plate 1 is fastened a bracket 17 to which is secured a second bracket 18 which carries a differential transformer T-1 having coils wrapped around a central tube. The ends of tube 64 are screw threaded and support perforated nuts 20 and 21 therein. Rod 16 passes through and is slidably mounted in the holes through the centers of nuts 20 and 21. A core 22 is mounted on and movable lengthwise of transformer T-1 by rod 16. A spring 23 is interposed between the inner end of nut 20 and the right end of core 22. A second spring 24 is secured between the outer end of nut 21 and a cap 25 secured to rod 16.

A shoulder on rod 16 bears against the upper end 26 of a leaf spring 27 which is pivoted at 28 and which carries a screw 29 bearing upon the outer end of the actuating element 30 of the switch S-3. The switch S-3 is of a type of well known, small, electric switch. The outer surface of sphere 4 is covered with a thick layer of insulation 37.

*Heater*

| Pressure Source | H-1 | H-2 | H-3 | H-4 |
|---|---|---|---|---|
| Warm Up | Full | Full | Full | Full under control of magnetic amplifier M-1. |
| Under Control | H-1 and H-2 in series under control of magnetic amplifier M-1. | | Full | Off. |

The above tabulation shows the condition of the various heaters H-1, H-2, H-3 and H-4 when the pressure source is warming up, i.e. before the temperature of the lead has reached the melting point, and when the pressure source is under control, i.e. when part of the lead has melted so that the lead is in both the solid phase and the liquid phase and the pressure source is under control to maintain the lead in both these phases. "Full" means a heater is putting on the maximum heat of which it is capable.

Figure 4:
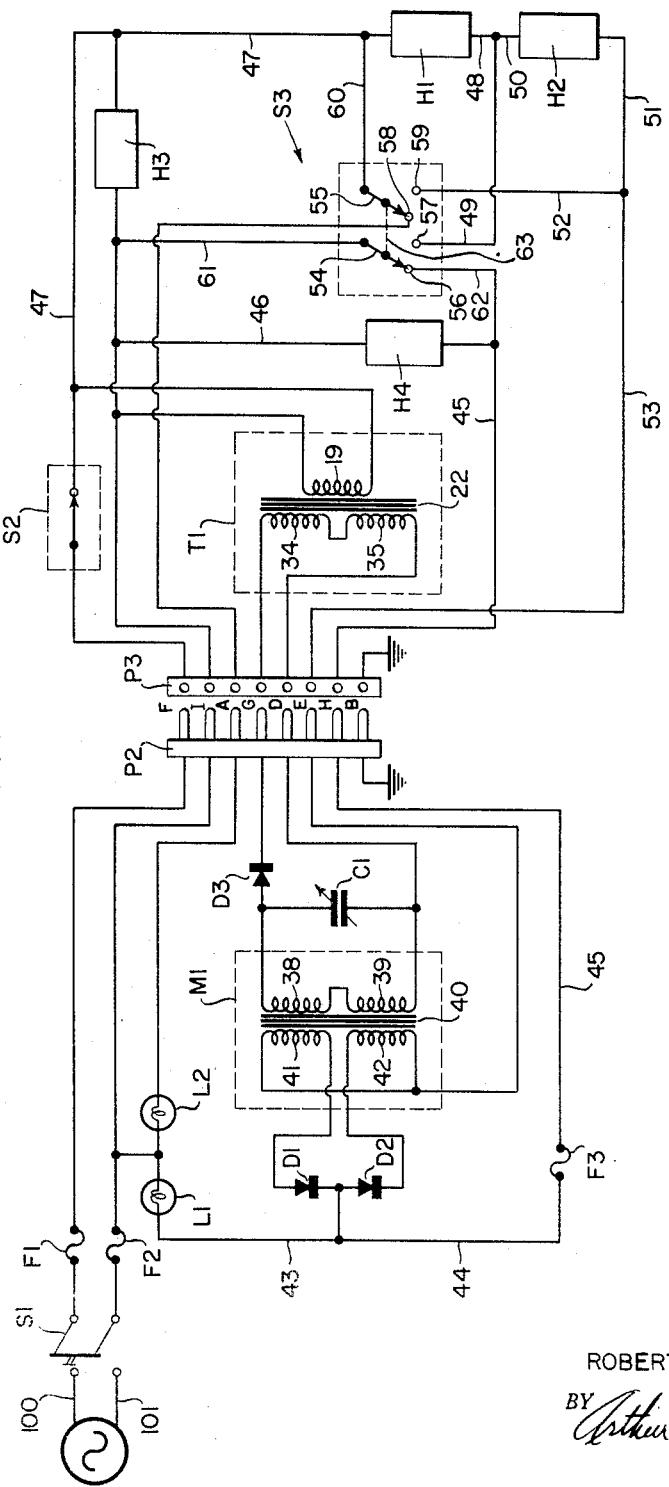
Fig. 4 is an electric circuit diagram.

Fig. 4 is an electric circuit diagram showing the electrical connections between the various components of the pressure source by means of which the lead is brought up to the melting temperature and maintained in both the solid and liquid phases.

Conductors 100 and 101 are connected to a conventional, commercial source of 115 volts, alternating current electricity through a manually operable, toggle switch S-1 and a pair of fuses F-1 and F-2 to two contacts of a first plug P-2 adapted to mate with a second plug P-3. Plugs P-2 and P-3 have a plurality of pairs of contacts A, B, C, D, E, F, G, H and I mounted in them. Contacts F of plugs P-2 and P-3 are connected to one side of a second switch S-2. Switch S-2 is adapted to be actuated by the over-pressure of the steam within the inner sphere 5.

Connected across contacts F and I of plugs P-2 and P-3, is a third heater H-3 which is wrapped around the column of the pressure source.

Also connected across contacts F and I of plugs P-2 and P-3, is the input coil 19 of the differential transformer T-1. Transformer T-1 has a core 22 and a pair of oppositely wound, output coils 34 and 35, the inner ends of which are connected together and the outer ends of which are connected to the contacts G and D, respectively, of the plugs P-2 and P-3.

On its opposite side, contact G is connected to one side of a rectifier D-3, which may be a silicon diode. Between the opposite side of the diode D-3 and the contact D of plugs P-2 and P-3, is connected a capacitor C-1, which may be a tantalum capacitor.

Across capacitor C-1 is connected a magnetic amplifier M-1, such as that manufactured and sold by Westinghouse Electric Corporation under its trademark "Magamp." Amplifier M-1 comprises a pair of oppositely wound input coils 38 and 39 connected in parallel with capacitor C-1. A core 40 cooperates with input coils 38 and 39 and with output coils 41 and 42 which are also oppositely wound. One end of each of the output coils 41 and 42 is connected to the contact E of the plugs P-2 and P-3. The oposite end of each of output coils 41 and 42 is connected through diodes D-1 and D-2, respectively, to a wire 43 which is connected through a lamp L-1 and through fuse F-2 and switch S-1 to line 101.

Wire 43 is also connected through wire 44, fuse F-3, wire 45, contacts H, heater H-4, and wire 46 to contact I of plugs P-2 and P-3.

Switch S-3 is a double-pole, double-throw switch which is actuated by the pressure created by the volume change of the lead between spheres 4 and 5. This pressure is conducted by means of tube 11 to bellows 14, rod 16 and leaf spring 27. The output side of switch S-2 is connected by means of wires 47 and 60 to the movable contact 55 of switch S-3 which is ganged together with movable contact 54 by a mechanical connection 63. Movable contact or switch blade 54 may engage with either stationary contact 56 or stationary contact 57. Movable contact or switch blade 55 may engage either with stationary contact 58 or stationary contact 59.

Heaters H-1 and H-2 are mounted on the outer surface of outer sphere 4. The output side of switch S-2 is connected by wire 47 to the heater H-1. Wires 48 and 49 connect the output side of heater H-1 to stationary contact 57. Wires 48 and 50 connect the output side of heater H-1 to heater H-2. Wires 51 and 52 connect the output side of heater H-2 to stationary contact 59. Wires 53 and 52 connect contact E of plugs P-2 and P-3 to stationary contact 59.

The operation of the high pressure source of this invention is as follows:

Lead is filled into the space between the spheres 4 and 5 by means of a tube 38 which is normally closed by a ball 39 secured in position by a socket head screw 40. Distilled water is put in the interior of the sphere of 5 until it is approximately half full. The interior of the tubes 11 and the space between the cylinder 13 and the outside of the bellows 14 is filled with a mixture of lead and bismuth which has a melting point of approximately 250° F.

As the device heats up, the mixture of lead and bismuth melts. The lead between the spheres 4 and 5 melts at approximately 620° F. The distilled water in sphere 5 produces saturated steam at a pressure corresponding to the temperature of the lead bath. This pressure is transmitted by the water through an outlet opening 9 in column 2 to an output pipe 10 connected to an indicator, recorder or controller or other device to which it is desired to connect this extremely accurate source of high pressure.

When the pressure source is in normal, operating condition the lead in the space between the spheres 4 and 5 is in both the solid phase and the liquid phase because it is heated to its particular melting point temperature. The desirable relationship of solid to liquid is maintained by means of the heaters H-1 and H-2 controlled by the volume change resulting when the solid changes into liquid. As long as solid and liquid are both present, the temperature surrounding the sphere 5 will remain constant at the exact melting point of the substance (lead) between the spheres 4 and 5. The water within sphere 5 is in both the liquid phase and the gas phase. Water is selected on the basis of its saturation pressure being equal to the reference pressure desired.

When it is desired to start the pressure source from a low temperature so as to warm up the pressure source and melt at least a portion of the lead, the switch S-1 is closed manually. The switch S-2 is closed because the steam pressure is not sufficient to cause it to open. The switch S-3 is in the opposite position to that in which it is shown in Fig. 4 of the drawings because the temperature of the lead is not sufficient to move switch S-3 to the control position shown in Fig. 4.

Heater H-1 is connected across the line comprised of wires 100 and 101 by the circuit comprised of wire 47, heater H-1, wires 48 and 49, stationary contact 57, movable contact 54, and wire 61.

Heater H-2 is connected across the circuit formed of wires 100 and 101 by the circuit comprised by wire 47, wire 60, movable contact 55, stationary contact 59, wires 52 and 51, heater H-2, wires 50 and 49, stationary contact 57, movable contact 54, and wire 61.

Heater H-4 is connected across the line comprised by wires 100 and 101 and is under the control of magnetic amplifier M-1. Heater H-4 is connected by the circuit comprised of wire 47, wire 60, movable contact 55, stationary contact 59, wires 52 and 53, contact E of plugs P-1 and P-2, output coils 41 and 42 of amplifier M-1, diodes D-1 and D-2, wires 43 and 44, fuse F-3, wire 45, heater H-4, and wire 46.

Light L1 is connected in circuit by wire 43 while L2 is extinguished because stationary contact 58 is out of engagement with movable contact 55.

Since all four heaters H-1, H-2, H-3 and H-4 are in circuit, the lead in the space between outer sphere 4 and inner sphere 5 melts and the water in the interior of inner sphere 5 boils. As the lead melts, it applies pressure to the tube 11 and, thence, through the mixture of lead and bismuth, to the outside of bellows 14 and thus moves rod 16 and core 22 relative to the output coils 34 and 35 of the differential transformer T-1. Before core 22 is moved to any appreciable extent, switch S-3 is actuated, by means of rod 16 and spring 27, into position in which switch S-3 is shown in Fig. 4. This movement of switch S-3 connects heaters H-1 and H-2 in series under the control of magnetic amplifier M-1 because movable contact 55 disengages stationary contact 59 and engages stationary contact 58 and thereby energizes light L2. Simultaneously, movable contact 54 disengages stationary contact 57 and engages stationary contact 56 thereby connecting the series combination of heaters H-1 and H-2 and providing a bypass around heater H-4. Heaters H-1 and H-2 are connected in series across the line formed by wires 100 and 101 and under the control of magnetic amplifier M-1 by the following circuit: wire 47, heaters H-1 and H-2, wires 51 and 53, output coils 41 and 42, diodes D-1 and D-2, wires 43 and 44, fuse F-3, wires 45 and 62, stationary contact 56, movable contact 54 and wire 61.

When the pressure source is in the control position in which it is shown in Fig. 4, if the pressure of the steam issuing from sphere 5 changes due to changes in the external hydraulic volume, heat is added to or extracted from the lead between the spheres 4 and 5 in an amount equal to the heat of vaporization or condensation of that volume of steam which had to be formed or condensed in order to main the saturation pressure within sphere 5. This addition or subtraction of heat from the lead causes a percentage of the lead bath to liquify or solidify with a resulting change in the total volume of the lead bath. (Lead expands approximately 4% by volume when changing from solid to liquid.) This change in the total lead bath volume causes a pressure change to be applied to tube 11. The mixture of lead and bismuth, which is liquid at these temperatures, transmits this change in pressure to the bellows 14 and thence, by means of rod 16, to core 22. A change in position of core 22 changes the output control voltage of transformer T-1 which causes a proportional change in the amount of current which can pass through the gate winding of the magnetic amplifier to heaters H-1 and H-2. This change in heat output from heaters H-1 and H-2 is maintained until the lead bath is brought back to the correct ratio of solid to liquid lead at which time the total volume of the lead bath will be such that the core 22 will again be restored to its control equilibrium position. This arrangement establishes a closed feedback control loop around the lead bath which automatically maintains the correct ratio of solid and liquid lead in the lead bath.

The operation of the differential transformer T-1 and the magnetic amplifier M-1 is as follows: When the pressure source requires more heat, the core 22 is moved with relation to coils 34 and 35 in such a way that the output of the differential transformer is varied. This causes a corresponding variation in the output of the magnetic amplifier M-1 and causes a diminution in the alternating current electricity applied to the heater H-4 or to the heaters H-1 and H-2, which ever is connected under the control of the magnetic amplifier M-1.

What is claimed is:

1. A source of accurate pressure, including, a first container, a substance having a solid phase and a liquid phase in said first container, a second container in heat-transfer relation to said first container, a substance having a liquid phase and a gas phase in said second container, first heating means for applying heat to the substance in said first container so as to maintain said substance at the temperature at which said substance is in both a solid phase and a liquid phase, second heating means for applying heat to the substance in said second container so as to maintain said substance at the temperature at which said substance is in both a liquid phase and a gas phase, and means responsive to the pressure caused by a volume change of said first substance and controlling the heat applied to said first heating means and to said second heating means.

2. A source of accurate pressure capable of withstanding severe shock and substantially independent of the position in which it is mounted, including, a base plate, a column mounted on said base plate, a first stainless steel sphere welded to said column, a second stainless steel sphere welded to said column and concentric with and spaced from said first sphere, an electric heater cartridge mounted on said column and in heat transfer relation to material within said second sphere, a second electric heater in heat transfer relation to material within said first sphere and without said second sphere, distilled water forming the material within said second sphere, lead forming the material within said first sphere and without said second sphere, a collapsible stainless steel tube at least partially immersed in said lead, a cylinder mounted on said first sphere and communicating at its interior with the interior of said stainless steel tube, a bellows secured to said cylinder and forming a movable wall thereof, a mixture of lead and bismuth within said stainless steel tube and between the interior of said cylinder and exterior of said bellows, a rod secured to said bellows on the outer side thereof and movable therewith, an armature mounted on and movable with said rod, a coil wrapped around and allowing free movement of said armature and cooperating electrically therewith, a spring biasing said rod and said bellows against the pressure of said lead, and an electric switch having an operating member engaged with and operated by said rod to move said switch from open to closed position and vice versa upon movement of said rod, said switch controlling the flow of electricity to said cartridge heater, and said coil controlling the flow of electricity to said second heater.

3. A source of accurate pressure, including, a first stainless steel sphere, a second stainless steel sphere located within and concentric with said first stainless steel sphere and spaced therefrom, a substance having a liquid phase and a gas phase within said second sphere, a substance having a solid phase and a liquid phase within said first sphere and without said second sphere, means for applying heat to the material within said second sphere, second means for applying heat to the material within said first sphere and without said second sphere, and means responsive to the pressure of the material within said first sphere and without said second sphere and adapted to control the supply of heat to said second means.

References Cited in the file of this patent

UNITED STATES PATENTS

| | | |
|---|---|---|
| 1,790,555 | Plumb | Jan. 27, 1931 |
| 2,338,691 | Tucker | Jan. 4, 1944 |
| 2,524,886 | Colander et al. | Oct. 10, 1950 |
| 2,820,134 | Kobayashi | Jan. 14, 1958 |
| 2,898,434 | Lemmerman et al. | Aug. 4, 1959 |